United States Patent
Wullschleger

(10) Patent No.: US 6,168,657 B1
(45) Date of Patent: Jan. 2, 2001

(54) ADHESIVE VARNISH TO RECEIVE POWDERED PIGMENTS

(75) Inventor: Raffael Wullschleger, Mönchaltorf (CH)

(73) Assignee: Rafka GmbH, Monchaltorf (CH)

( * ) Notice: Under 35 U.S.C. 154(b), the term of this patent shall be extended for 0 days.

(21) Appl. No.: 09/297,250

(22) PCT Filed: Aug. 17, 1998

(86) PCT No.: PCT/IB98/01252

§ 371 Date: Apr. 27, 1999

§ 102(e) Date: Apr. 27, 1999

(87) PCT Pub. No.: WO99/11723

PCT Pub. Date: Mar. 11, 1999

(30) Foreign Application Priority Data

Sep. 1, 1997 (CH) .................................................. 204/97

(51) Int. Cl.$^7$ ................................................. C09D 193/00
(52) U.S. Cl. ............................................................. 106/227
(58) Field of Search ............................................... 106/227

(56) References Cited

U.S. PATENT DOCUMENTS

| | | | |
|---|---|---|---|
| 64,125 | * | 4/1867 | Melsom ................................ 106/227 |
| 1,303,671 | * | 5/1919 | Illas ...................................... 106/227 |
| 1,897,686 | * | 2/1933 | Wilson .................................. 106/227 |
| 1,931,226 | * | 10/1933 | Humphrey ............................ 106/227 |
| 2,058,335 | * | 10/1936 | Mayo ..................................... 106/227 |
| 2,065,925 | * | 12/1936 | Overton et al. ....................... 106/227 |
| 2,395,361 | * | 2/1946 | Waldie .................................. 106/227 |
| 2,469,150 | * | 5/1949 | Boak ..................................... 106/227 |

FOREIGN PATENT DOCUMENTS

| | | |
|---|---|---|
| 30 20 381 | 12/1981 | (DE) . |
| 3 740 972 A1 | 6/1989 | (DE) . |
| 37 40 972 | 6/1989 | (DE) . |
| 526 329 | 9/1993 | (EP) . |
| 6916 * | of 1891 | (GB) .................................... 106/227 |
| 228 * | of 1914 | (GB) .................................... 106/227 |
| 474 746 | 11/1937 | (GB) . |

* cited by examiner

*Primary Examiner*—David Brunsman
(74) *Attorney, Agent, or Firm*—Ladas & Parry

(57) ABSTRACT

The novel adhesive varnish to receive powdered pigments contains colophony and pretreated linseed oil in a solvent system, which consists primarily of naphtha of the boiling range ~80 through ~160° C. and technical ethanol. The adhesive varnish-powdered pigment system serves for temporary colored drawing on and/or lettering of substrates made of glass, polished stone, glazed ceramic, but also on surfaces of baked lacquer and synthetic or natural materials, in particular of display windows.

4 Claims, No Drawings

ADHESIVE VARNISH TO RECEIVE POWDERED PIGMENTS

The present invention description concerns an adhesive varnish, its use to receive powdered pigments, as well as applications of the use mentioned.

Paints are, according to the technical literature, coating materials of liquid to paste consistency which are applied by brushing, spraying, dipping, or pouring on the surfaces or objects to be painted and which, through physical and/or chemical drying, yield a firmly adhering coating on the substrate, for the most part a very thin layer (paint film). Paints consist of a dissolution of suitable organic film formers and plasticizers in a solution or a mixture of solutions, possibly with the addition of siccatives (drying agents) or even pigments. Pigmented paints are referred to as varnish paints.

Important paints are now described specifically:

Oil varnishes are solutions of natural or synthetic resins and drying oils with additions of siccatives in volatile organic solvents, such as oil of turpentine or naphtha. Drying oils used in addition to wood oil are primarily linseed oil, also tall oil. castor oil, oiticica oil. and perilla oil. The oils are concentrated by heating to form bodied oils, whereby groups of 2 to 3 oil molecules generally form.

The term synthetic resin paints usually refers to air- and oven-dried alkyd resin paints, also with additions of other resin types. In a broader sense, synthetic resin paints are all paints or varnish paints with synthetic resins as film formers. These include, for example, urea, melamine, and phenolic resins and other plastic materials for paints.

Essential in all reported cases is thus the fact that the paint and is applied either without pigment powder, i.e., solid pigment mixtures, or already contains these. Painting with subsequent independent addition of pigments has not been taught.

The adhesive varnish to receive powdered pigments according to the invention overcomes this disadvantage.

The adhesive varnish to receive powdered pigments according to the invention is characterized by contents of colophony and pretreated linseed oil in a solvent system which contains primarily hydrocarbons, in particular naphtha with a boiling range ~80 to ~160° C. and technical ethanol.

Said colophony is advantageously technically pure and is present in the mixture at a rate of 14 through 36—in particular 24 through 30—wt-%; the pretreated linseed oil is formally prepolymerized under air intake and is present in the mixture at a rate of 8 through 20—in particular 10 through 16—wt-%.

It is important that the solvent system consist primarily of naphtha with a boiling range ~100 through ~140° C. and includes as a second component technical, possibly denatured ethanol at a rate of 1 through 10 wt-%—based on the system.

The primary role of the adhesive varnish specified above applied to a substrate—possibly in the form of symbols, letters, or the like—is to receive even a plurality of powdered pigments, whereby the powdered pigment(s) is(are) applied to the adhesive varnish freely or by means of precut films, in particular brushed on or blown on.

The powdered pigment is advantageously dust-free, i.e., it has virtually no components of 0 . . . 10 $\mu$m.

Possibly, the pigmented adhesive resin layer can be protected by means of a transparent lacquer coat or film.

The pigmented adhesive resin layer can subsequently be completely removed easily by means of a mixture of technical grade ethanol and water. Washing off using known biodegradable cleaners is also possible.

The application of said resin-powdered pigment system according to the invention serves for colored drawing and/or writing on substrates of glass, polished stone, glazed ceramic, but also on baked lacquer and synthetic or natural material surfaces, in particular for temporary colored writing on display windows.

EXAMPLE 1

A mixture of 4 pbw naphtha with a boiling range ~100 through ~140° C., 2 pbw colophony, 1 pbw of thermally pretreated linseed oil, and 0.2 pbw technical ethanol was homogenized under agitation at room temperature. The liquid preparation could be easily applied to clean glass by means of a brush wrapped with material or cotton; the adhesion was excellent. Even before the adhesive varnish was completely dry, it was possible to apply a plurality of powdered pigments ("theater colors") by means of a swab to various parts of the paint-substrate, without them "smearing" in the process. Said colors consisted of or included inorganic pigments such as rutile, iron oxide black, iron oxide red, or umber; brighter colors include organic pigments such as benzidine yellow, monoazo yellow or phthalocyanine green with carriers such as zinc sulfide, barium sulfate, or calcite.

The pigment-paint, completely dried after some time, was then washed off residue free with a mixture of water and technical ethanol.

EXAMPLE 2

A composition analogous to that reported in Example 1, but with approximately 10% less naphtha, was applied outdoors on a display window at approximately 20° C. ambient temperature to an extent predefined by a film; after removal of the film virtually no curtaining of the adhesive varnish could be detected.

Powdered pigments were then blown on to this base in a horizontal layer arrangement. Relatively large lettering running upward at an angle in various horizontal colored strips was obtained; a very impressive advertising symbol.

Even after two weeks, the writing remained unchanged with regard to extent and color.

Through variation, in particular of the linseed oil content, it was possible to compensate adequately for the effect of the ambient temperature on the practical curing behavior of the adhesive varnish.

In the following, additional chemical-technical data concerning the major components of the adhesive varnish according to the invention are reported:

Thermally pretreated technical linseed oil:
Form: liquid
Color: yellow/brown
pH-value: neutral
Viscosity: 100–5000 mPa·s (DIN 53015, 20° C.)
Melting temperature: ~0° C.
Boiling temperature: ~250° C. (1 kPa)
Density: at 20° C. approximately 0.930 g/cm$^3$
Solubility in water: virtually insoluble
Soluble in other solvents: alcohol, hexane;

Technical colophony (resins of various types of the species Pinus L.):
Solubility in water: insoluble
Soluble in other solvents: ethanol, ether Ethanol, technical, denatured (content: ethanol ~92 wt-%, water ~6 wt-%, methyl ketones ~2 wt-%):

pH value: at g/l H₂O
Viscosity: dynamic (20° C.) 1.2 mPa·s
Boiling temperature: 78° C.
Vapor pressure: (20° C.) –59 mbar
Density: (20°) 0.81 g/cm³
Solubility in water: soluble
 Naphtha/boiling range ~100/~140 (primarily $C_7$-alkanes):
Melting point: <20° C. in
Boiling range: ~98 through ~140° C.
Density at 20° C.: 0.71 through 0.74 g/cm³
Solubility in water at 20° C.: <1 g/l

What is claimed is:

1. An adhesive varnish to receive powdered pigments, wherein the varnish comprises colophony, pretreated linseed oil, hydrocarbons, and technical ethanol.

2. The adhesive varnish according to claim 1, wherein the colophony is technically pure and comprises 14–36 wt % of the varnish.

3. The adhesive varnish according to claim 1, wherein the pretreated linseed oil is thermally prepolymerized under air intake, and wherein the linseed oil comprises 8–20 wt % of the varnish.

4. The adhesive varnish according to claim 1, wherein the hydrocarbons comprise naphtha and optionally another component, wherein the naphtha has a boiling point in a range from about 100° C. through about 140° C.

* * * * *